United States Patent
Kadashevich

(10) Patent No.: US 7,865,556 B2
(45) Date of Patent: Jan. 4, 2011

(54) FAILOVER PROCESSING FOR AUTOMATIC RESPONDER IN MIXED SERVER ENVIRONMENT

(75) Inventor: Julie Kadashevich, Tyngsboro, MA (US)

(73) Assignee: International Business Machines Corporation, Armonk, NY (US)

(*) Notice: Subject to any disclaimer, the term of this patent is extended or adjusted under 35 U.S.C. 154(b) by 557 days.

(21) Appl. No.: 11/613,487

(22) Filed: Dec. 20, 2006

(65) Prior Publication Data

US 2008/0155023 A1 Jun. 26, 2008

(51) Int. Cl.
*G06F 15/16* (2006.01)
(52) U.S. Cl. ...................................................... 709/206
(58) Field of Classification Search ......... 709/203–211, 709/220–226; 358/1.15; 705/6, 1, 28, 26, 705/27, 56, 35, 37, 44, 10; 717/121, 126, 717/177, 101; 707/100, 10
See application file for complete search history.

(56) References Cited

U.S. PATENT DOCUMENTS

| | | | |
|---|---|---|---|
| 5,181,236 A | | 1/1993 | LaVallee et al. |
| 5,754,782 A * | | 5/1998 | Masada ...................... 709/213 |
| 6,327,343 B1 | | 12/2001 | Epstein et al. |
| 6,463,462 B1 | | 10/2002 | Smith et al. |
| 6,580,787 B1 | | 6/2003 | Akhteruzzaman et al. |
| 6,622,021 B1 | | 9/2003 | Takala |
| 6,684,238 B1 * | | 1/2004 | Dutta ......................... 709/206 |
| 6,731,323 B2 | | 5/2004 | Doss et al. |
| 6,745,230 B1 | | 6/2004 | Cao et al. |
| 7,093,025 B1 * | | 8/2006 | Gupta ........................ 709/206 |
| 2002/0091776 A1 * | | 7/2002 | Nolan et al. ................. 709/206 |
| 2004/0122889 A1 * | | 6/2004 | Tuijn et al. .................. 709/201 |
| 2006/0015645 A1 | | 1/2006 | Ocko et al. |

FOREIGN PATENT DOCUMENTS

JP 06090251 A 3/1994

* cited by examiner

*Primary Examiner*—Larry Donaghue
*Assistant Examiner*—Mark O Afolabi
(74) *Attorney, Agent, or Firm*—Raymond Szeto; Hoffman Warnick LLC

(57) ABSTRACT

A solution to failover processing for automatic responder in a mixed server environment. The instant response system is part of mail delivery system without requiring every server in the cluster to be upgraded to the latest version. The auto-responder is installed in the router, as part of the mail delivery. In order to process messages delivered to the older version of servers seamlessly, the invention comprises an agent trigger which runs only on server start, an agent with a new type in the user mail file, which performs Out of Office functionality (similar to the current mail template functionality) or "failover" agent. The router processing for auto responder will enable the agent in the user mail file when it becomes activated (based on user specified configuration). The agent does not require any special security configuration because it is signed by the server. The email comes from the mail owner (intended recipient) setting the "Principal" field. The router auto responder processing marks each email it auto-responds (this happens before the email is written down to the user mail box, so this special marking does not require any additional I/O). It also stamps out of office profile document with date it performed the processing.

20 Claims, 8 Drawing Sheets

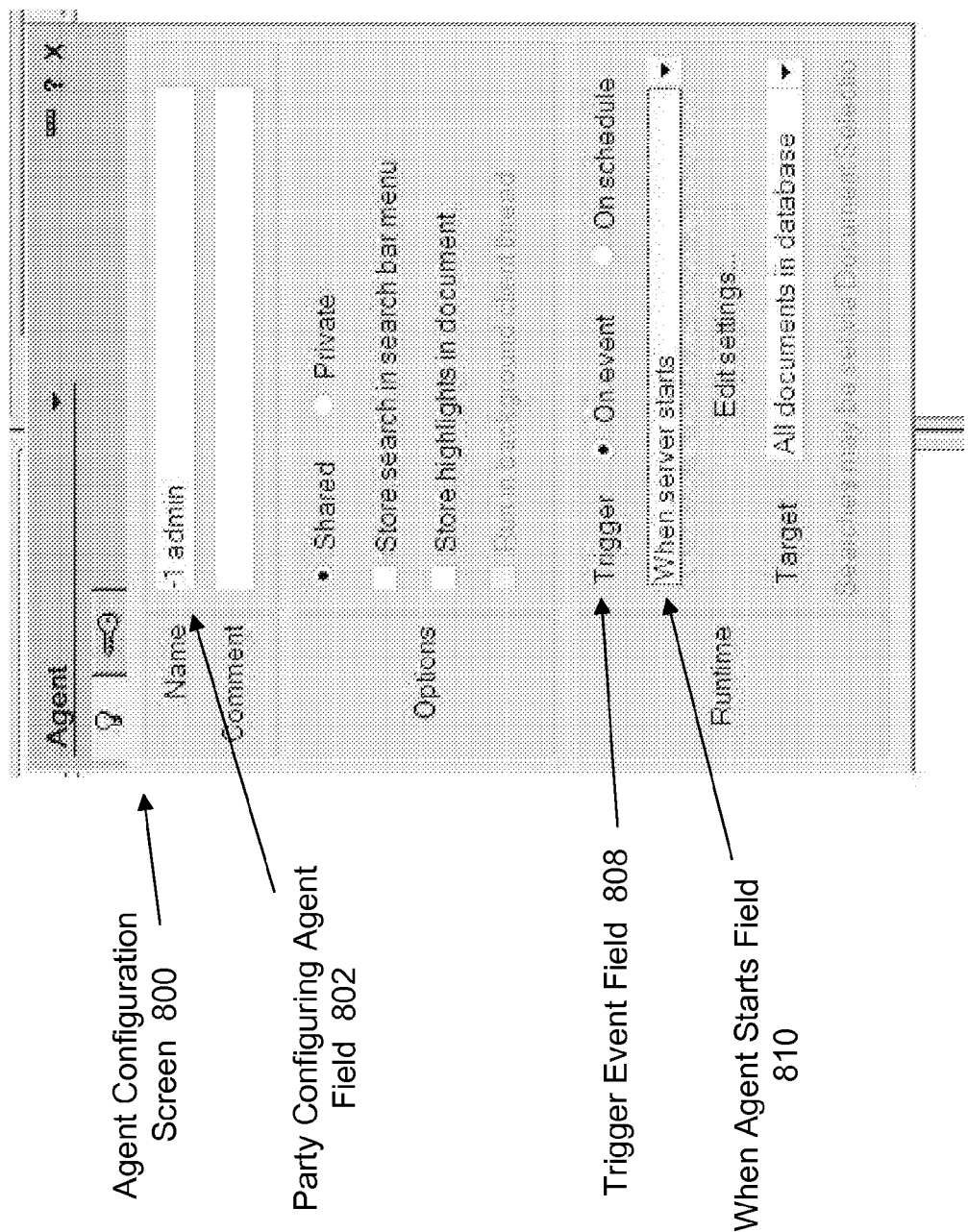

FAILOVER PROCESSING FOR AUTOMATIC RESPONDER IN MIXED SERVER ENVIRONMENT

FIELD OF THE INVENTION

The invention relates generally to mixed server environments, and, more particularly, to a system and method for automatically responding to emails when the principal mail server fails.

BACKGROUND OF THE INVENTION

Computer networking is the communication between computer systems. Such networks involve at least two devices capable of being networked with at least one usually being a computer. The devices can be separated by a few meters (e.g. via Bluetooth) or thousands of kilometers (e.g. via the Internet).

For instance, FIG. 1 illustrates a typical networking environment 100. It has a network cloud 101 which has routers (two of which are shown as 102 and 106) and server components 104 (examples include IBM® Domino® server software, FreeBSD, Solaris and Linux server software). A router acts as a junction between two or more computers or networks to transfer data packets among them. The server components 104 may be attached to databases or other memory 105. Further, in the network, there may be other servers, such as server 104A. A problem is that the server software in server 104 and 104A may not be identical and may not have the same capability. This will be discussed in greater detail below.

The network further comprises a client 108 which communicates through the networking environment 100 to other computers 114A, 114B, 114C, 114D. Client 108 may contain many software applications to serve the user such as word processing applications or the like. One of the applications may be an email client 110. One example of a very popular and highly successful email client is IBM's Lotus® Notes® client which works in conjunction with IBM's Lotus® Domino server software. A description of Lotus Notes and Lotus Domino can be found here: http://www-142.ibm.com/software/sw-lotus/products/product4.nsf/wdocs/noteshomepage?OpenDocument&cwesite=notes Email Client Software 110 is installed on a client computer 108 and works in conjunction with a main mail server installed on the Server 104. The Email Client 110 is a computer program that is used to read and send e-mail. There are many different types of email clients, such as IBM Lotus Notes, Mozilla Thunderbird, and Microsoft Office Outlook.

Each Email Client 110 generally has a Main Email Server 104. The Main Email Server 104 is the primary email server for a client, such as Client 110. A Back Up Server 104A provides back up or redundancy for Main Mail Server 104 in the case where there is a Main Mail Server 104 failure in which case emails "fail over" to the Back Up Email Server 104A. In the case of the Domino server, Main Email Server 104 provides most of the functionality for the Notes Client Email Client 110. The Notes client 110 allows the user to manipulate the user's email, for instance, directly on the Server 104 or it allows the user to replicate the contents of the mailbox to the client so that the user may locally manipulate the email.

However, it may be that the email server software of the main email server 104 and the Back up Email Server 104A may have different levels of functionality. This is not unusual as many times server software is updated on an irregular basis due to one of many reasons.

Main Email Server 104 may include an Agent Component 107. The term "agent" describes a software abstraction, an idea, or a concept, which provides a convenient and powerful way to describe a complex software entity that is capable of acting with a certain degree of autonomy in order to accomplish tasks on behalf of its user. One familiar example is the "Out of Office" agent. The "Out of Office" agent, in Lotus Notes, is a LotusScript agent that is part of the Notes mail template. "Out of Office" agents can be programmed in other languages, such as in Java. When enabled and so configured, the "Out of Office" agent automatically responds to mail that arrives when a user is out of the office. The user may utilize Notes Client 110 to configure the "Out of Office" Agent 107 directly on the Server 104 by creating "Out of Office" Agent Configuration File 109 or, alternatively, user may configure "Out of Office" agent 107 at a local Agent Configure Component 110. The Agent Configuration file 111 would then be sent to Server Agent 107 for use. An example of a Configuration Screen 400 is shown in FIG. 4 having a User Name Field 402 and an Activation Check Box 404. FIG. 5 shows Enabling Screen 500 having a Leaving Field 502 to indicate when the user is leaving or is otherwise unavailable. Configuration Screen 500 further has a Returning Field 504 to indicate when the user is returning or is otherwise available. When configuring the agent, the user can specify the text of the message (Message 506), and set rules regarding who should not receive any messages, or who should receive a special message (Special Message 508). This is stored in an "Out of Office" Configuration File 111.

The Agent 107 generates automatic responses once for each person who sends mail to the user, even if the person sends several messages to the user during the user's absence—depending upon the contents of the "Out of Office" Configuration File 111 or, alternatively, "Out of Office" Configuration File 107 created directly on the Server 104.

The user, at Client 110, configures the Agent 107 by sending the "Out of Office" Configuration File 111 to the Router 106 which passes it on to Server 106. Server 106 stores the "Out of Office" Configuration File 111 in Server "Out of Office" Storage File 105. In Lotus Notes/Lotus Domino, the "Out of Office" Configuration File 111 is sent to Server 104 along with email. When another user, such as Other Computer 114D, sends an Email Message 118, Server 104 receives the Email Message 118 and stores it in an email box (Email box 2 145). Server "Out of Office" Agent 107 generates an Automatic Response 120 to the Sender (Other Computer 114D) based upon the "Out of Office" Configuration File 111 or "Out of Office" Configuration File 109.

Back up Server 104A has a second mailbox (Email box 2 146). This way if Main Server 104 fails, email can be deposited into Email box 2 146 for later pick up by the user.

However, it may be that Back up Server 104A does not have the Out of Office functionality, that is, it does not have the Server Out of Office Agent software.

This is also shown in FIG. 2 where Client 110 sends an "Out of Office" Configuration File 111 to Router 106. Router 106 forwards "Out of Office" Configuration File 111 to Server 104. Server 104 stores "Out of Office" File 111 in the Server "Out of Office" Storage File 105. Other Computer 114D sends an Email 118 to Client 110. Email 118 is received by Router 102 which forwards this to Server 104. Due to the Out of Office Configuration 111 being received by Server 104, Server Out of Office Agent 107 sends Out of Office Notification 120 to Router 102 which is forwarded to Other Computer 114D. Alternatively, in Lotus Domino, Routers 102, 106 do not forward configuration information but rather operate with a replication function. To generalize, all documents, including configuration documents, are kept in sync between all servers (primary and backup servers). So if some server goes down, backup server has the latest information (configuration as well as data documents).

Some time later, a Server 104 failure occurs at 234. Other Computer 114D sends another email 118 to Client 108. Email 118 is received by Router 102 which forwards this to Server 104. However, as the Server 104 is down, Server Out of Office Agent 107 is also not operational. The Email 118 fails over to Back Up Email Server 104A and is received and stored in the back up email box. No mail failure notification is sent as the email was successfully sent. However, as Back up Email Server 104A has no agent capability, no Out of Office response can be sent to Other Computer 114D. A variation of this problem is where Router 102, 106 have no agent capability and the Back-up Email Server 104A has agent capability but the primary email Server 104 has a different configuration due to its having an upgraded version of software. This would be considered a mixed server environment due to the fact that the servers have different levels of software. This may cause a problem for "Out of Office" responses. For instance, in IBM's Lotus Domino server software, in the latest version ("Domino 6"), (which includes a new router component), responses to emails are treated differently as it has a new implementation of out of office functionality which is not an agent. The response is performed in-line with mail delivery and, as it generates out-of-office responses, it marks messages to which it responded with a special flag. When the backup server does not have the latest version of the server/router software (which is common when the new version is just released), the messages are not responded to in-line with mail delivery (and therefore they are not marked as responded). Out-of-office agent exists in the old server and possibly in the new server (since this is not a new piece of software), but it is not used on the old server because only the new server has new "out of office" functionality. This problem is shown more clearly in FIG. 1A. New Server 149A has auto-response capability in Router component 150A but old Back Up Server 104A does not but rather has Agent 107A which is now longer used in the system. Routers 102A, 106A have no agent capability. So, if new Server 149A goes down, it fails over to Backup server 104A. When the new Server 149A comes back up from being down, it knows that there might be some documents that may not have been processed while it was down, and then it executes the Out of office agent to process messages that were missed. Out of office agent knows that they were missed because they are not marked by the new router component 150A (as well as qualifying because they are in the time frame when the user was away as well as pass all other parameters). However, if the emails were processed by the Back up server having down-level function, the emails, while having been processed, appear to Server 104 as if they hadn't because they were not marked. Therefore, it would be desirable if the new configuration were replicated on the back-up server.

Finally, when an "out of office" response is not sent, it poses a problem in that senders of emails or other communication to a user do not receive notification that the user is out of the office. Further, the user may wish to convey specific information to the sender which won't be sent due to the server failure.

In view of the foregoing, a need exists to overcome these problems by providing a system and method for failover processing for automatic responder in a mixed server environment.

SUMMARY OF THE INVENTION

The system and method of the present invention provides a solution to failover processing for automatic responder in a mixed server environment. The instant response system is part of mail delivery system without requiring every server in the cluster to be upgraded to the latest version. The automatic responder is installed in the router, as part of the email delivery. In order to process messages delivered to the older version of servers seamlessly, the invention comprises an agent trigger which runs only on server start which performs Out of Office functionality (similar to the current mail template functionality) or "failover" agent. The router processing for auto responder will enable the agent in the user mail file when it becomes activated (based on user specified configuration). The agent does not require any special security configuration because it is signed by the server. The email comes from the mail owner (intended recipient) setting the "Principal" field. The router auto responder processing marks each email it auto-responds (this happens before the email is written down to the user mail box, so this special marking does not require any additional I/O). It also stamps out of office profile document with date it performed the processing. When the server starts, if the failover agent is enabled, it collects all the documents from the time stamp in the profile document to current time. It skips documents that were already processed by the router responder.

BRIEF DESCRIPTION OF THE SEVERAL VIEWS OF THE DRAWINGS

These and other features of the invention will be more readily understood from the following detailed description of the various aspects of the invention taken in conjunction with the accompanying drawings that depict various embodiments of the invention, in which:

FIG. 7 shows a configuration screen for configuring the agent.

It is noted that the drawings are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As used herein, unless otherwise noted, the term "set" means one or more (i.e., at least one) and the phrase "any solution" means any now known or later developed solution. Additionally, the term "data store" means any type of memory, storage device, storage system, and/or the like, which can temporarily or permanently store electronic data, and which can be included in a storage and/or memory hierarchy (collectively referred to herein as a "memory hierarchy") for a computer system.

Figure 1:
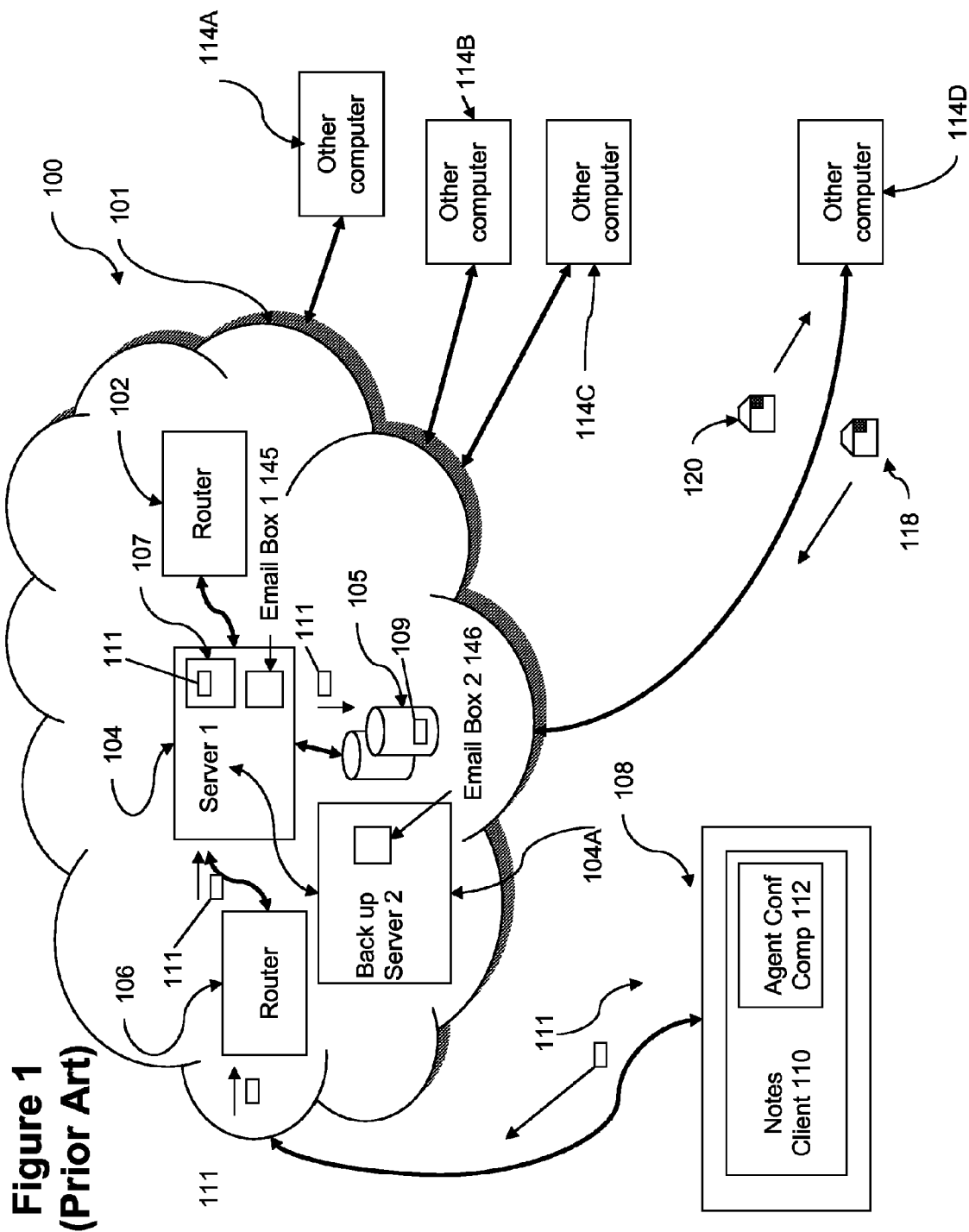
FIG. 1 is a block diagram showing the general components of a computer network system that can be used to route email from a sender to an intended recipient.
Figure 1A:
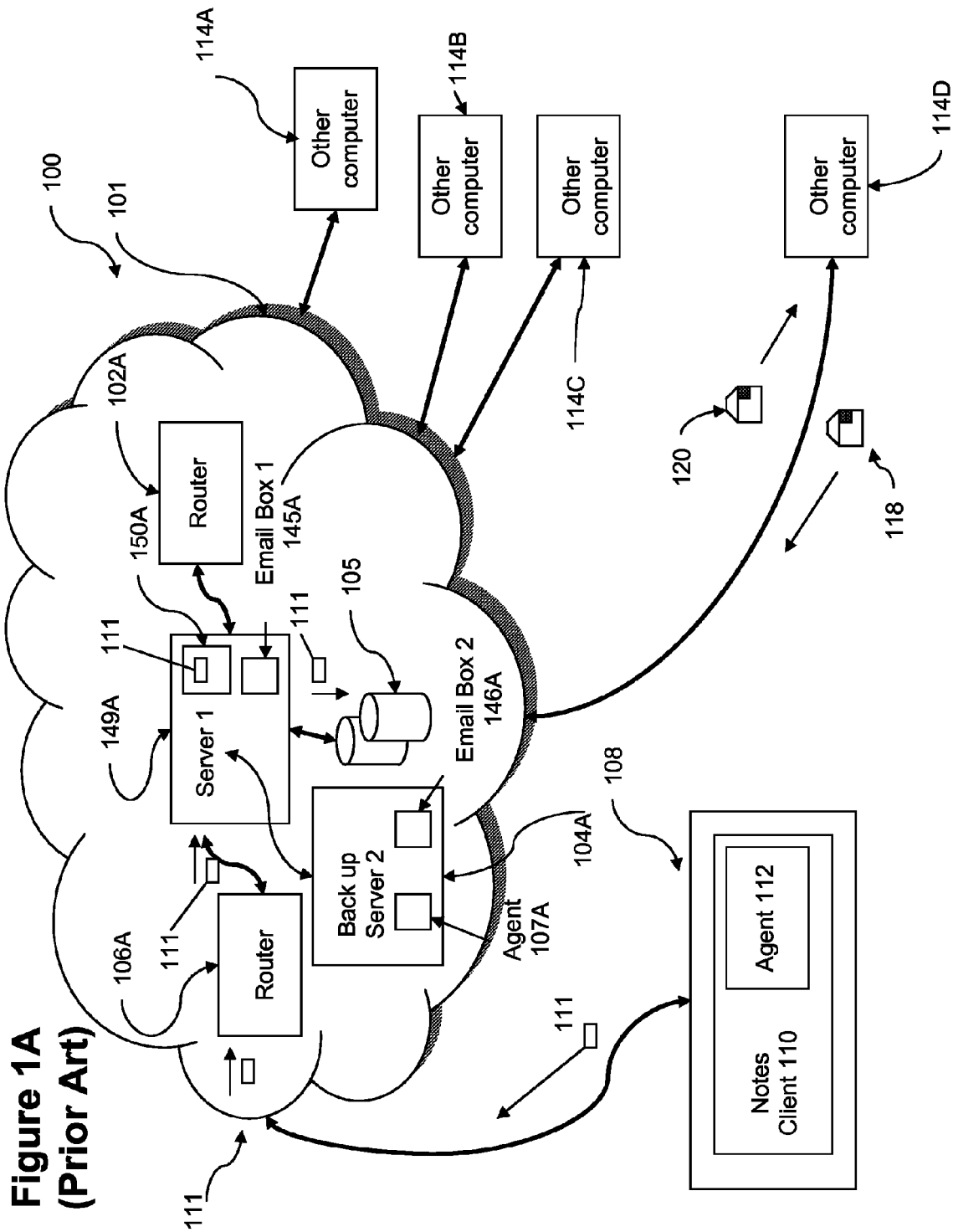
FIG. 1A is another block diagram showing the general components of a computer network system that can be used to route email from a sender to an intended recipient and responding with out-of-office responses when the intended recipient is not available.
Figure 2:
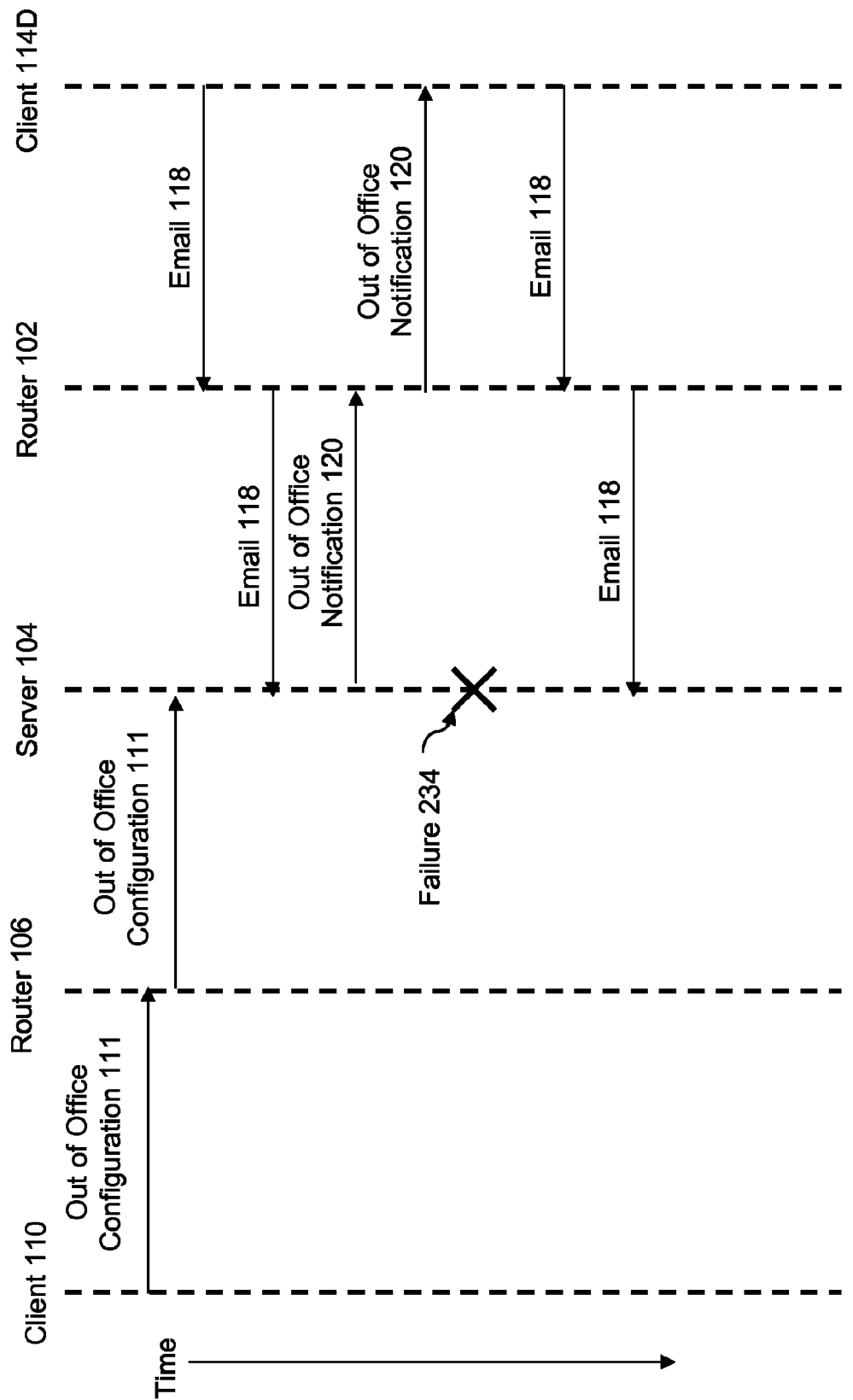
FIG. 2 shows a prior art process for passing emails between a sender client and an intended recipient client and sending "Out of Office" responses to the sender when the intended recipient is unavailable.
Figure 3:
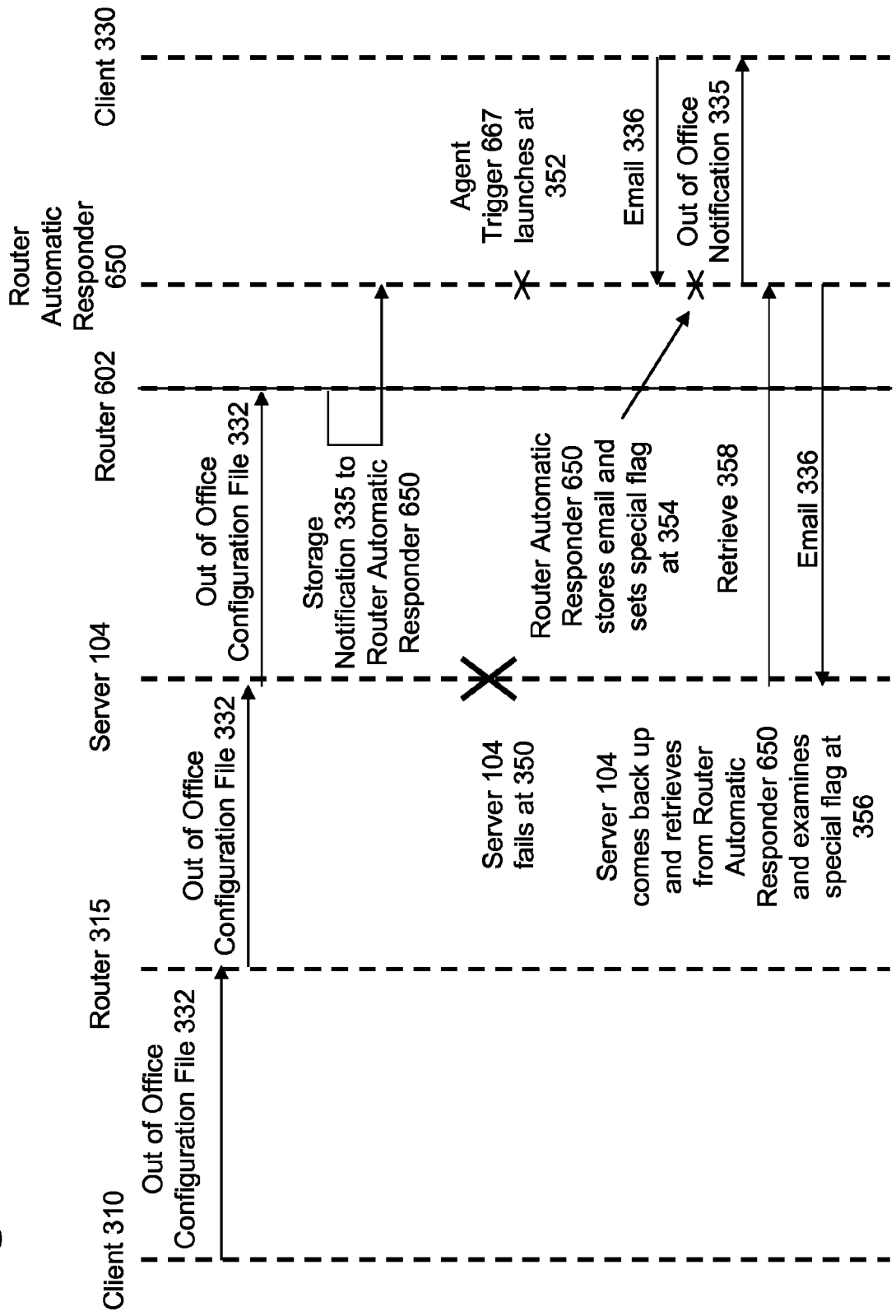
FIG. 3 shows a process for passing emails between a sender client and a recipient client and sending "Out of Office" responses to the sender when the intended recipient is unavailable of the present invention.

As shown in FIG. 3, the process of the present invention is shown. At 332, Client 310 sends an "Out of Office" Configuration File 332 to Router 315. Router 315 then forwards this on to Main Email Server 104. Main Email Server 104 receives the "Out of Office" Configuration File 332 and forwards the "Out of Office" Configuration File 332 to the Router 602 which has itself a Router Agent Responder 650. The Router Automatic Responder 650 has an Agent Trigger 667 which launches automatically when the Main Email Server 104 fails. Router 602 sends a Storage Notification 335 to Router Automatic Responder 650 indicating to Router Automatic Responder 650 that client 310 wishes that emails should be stored in the event of server failure. Agent Trigger 667 has a Special Flag 669 sent by Client 110 which indicates to Router Automatic Responder 650 to launch when Main Server 104 fails at 350. As shown, Agent Trigger launches at 352 so when an email 336 directed to client 310 from client 320, an Out of Office Notification 335 is returned to client 330. Router Automatic Responder 650 stores the Email 336 and sets Special Flag in email 336 to indicate it had been responded to at 354. At 356, Server 104 comes back up and retrieves email 336 and inspects the special flag to determine whether it had been responded to.

Figure 4:
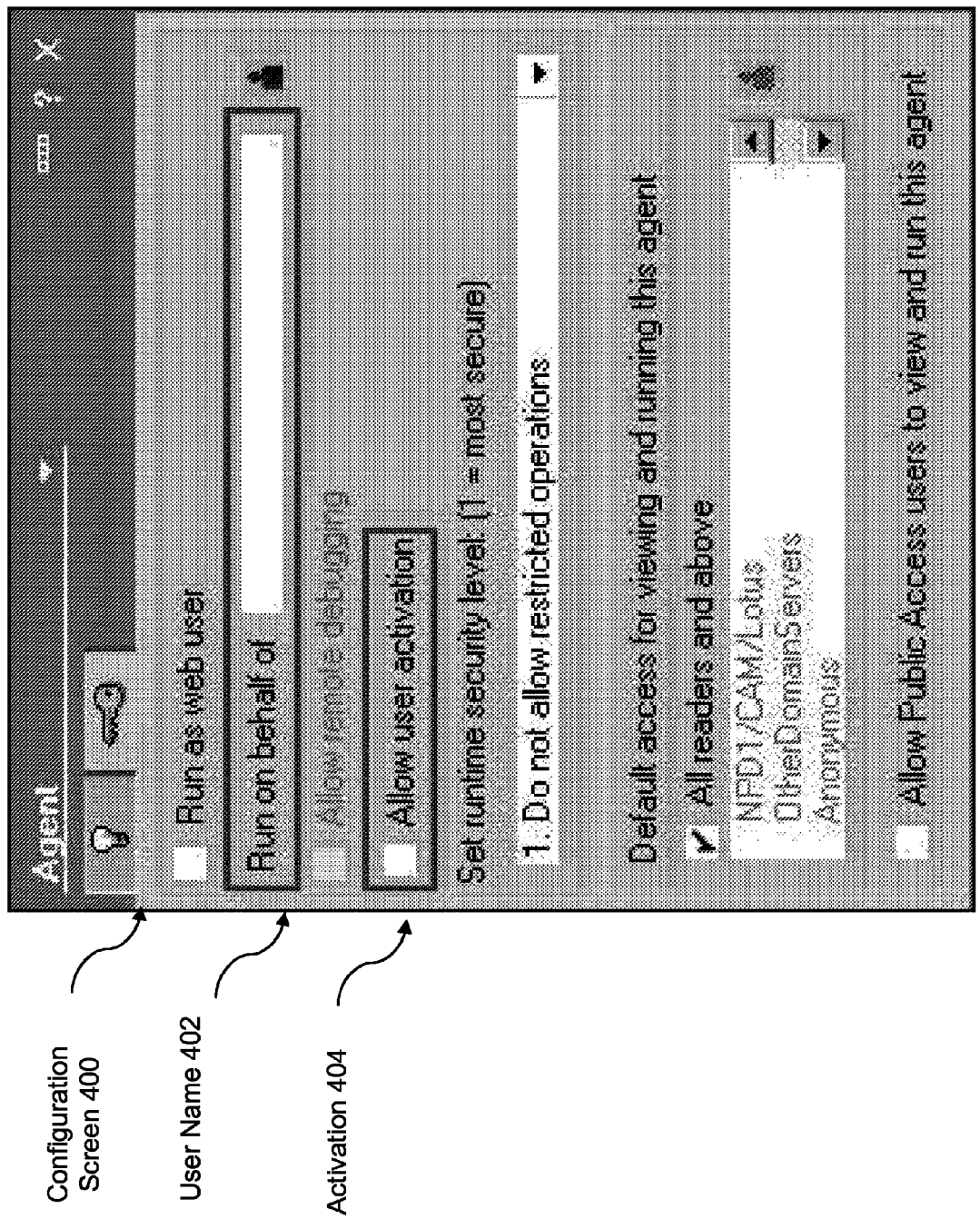
FIG. 4 shows a configuration screen for configuring an "Out of Office" Agent on the user's computer.

As shown in FIG. 4, the Configuration Screen 400 has a User Name Acceptance Field 402 which accepts the user's name of the user who will be unavailable. It also has an "An Allow Activation" Checkbox 404 for accepting the election of activation.

Figure 5:
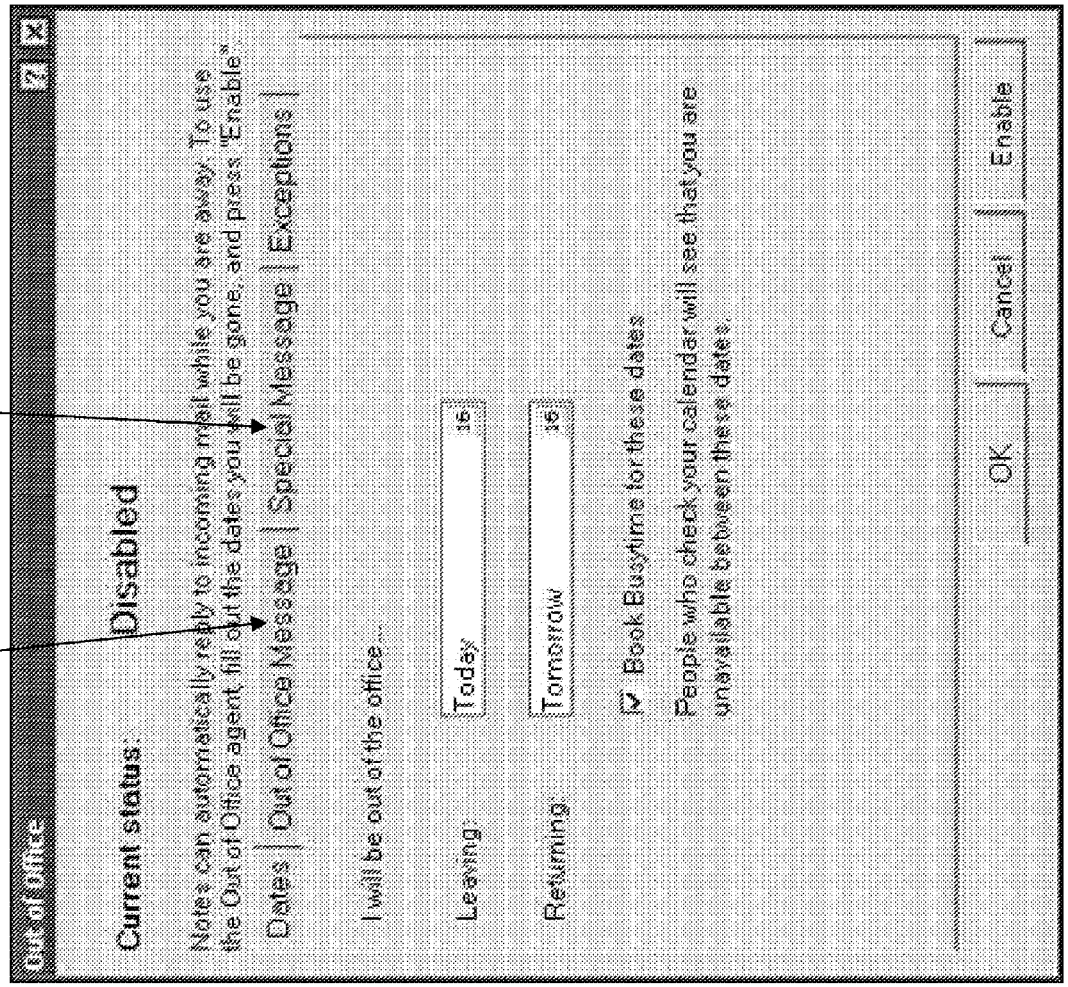
FIG. 5 shows a configuration screen for inputting the "Leaving Field" data as well as the "Returning Field" data.

FIG. 5 shows another Enabling Screen 500 having a Leaving Field 502 for identifying the leaving date of the user. Leaving Field 502 receives data from the user to accept data input from the user to identify the Intended Leaving Date Field 310. It further has a Returning Field 504 to identify the return date of the user. Message Field 506 allows the user to have a message for the senders. Special Message 508 allows the user to have a special message for the certain senders.

Figure 6:
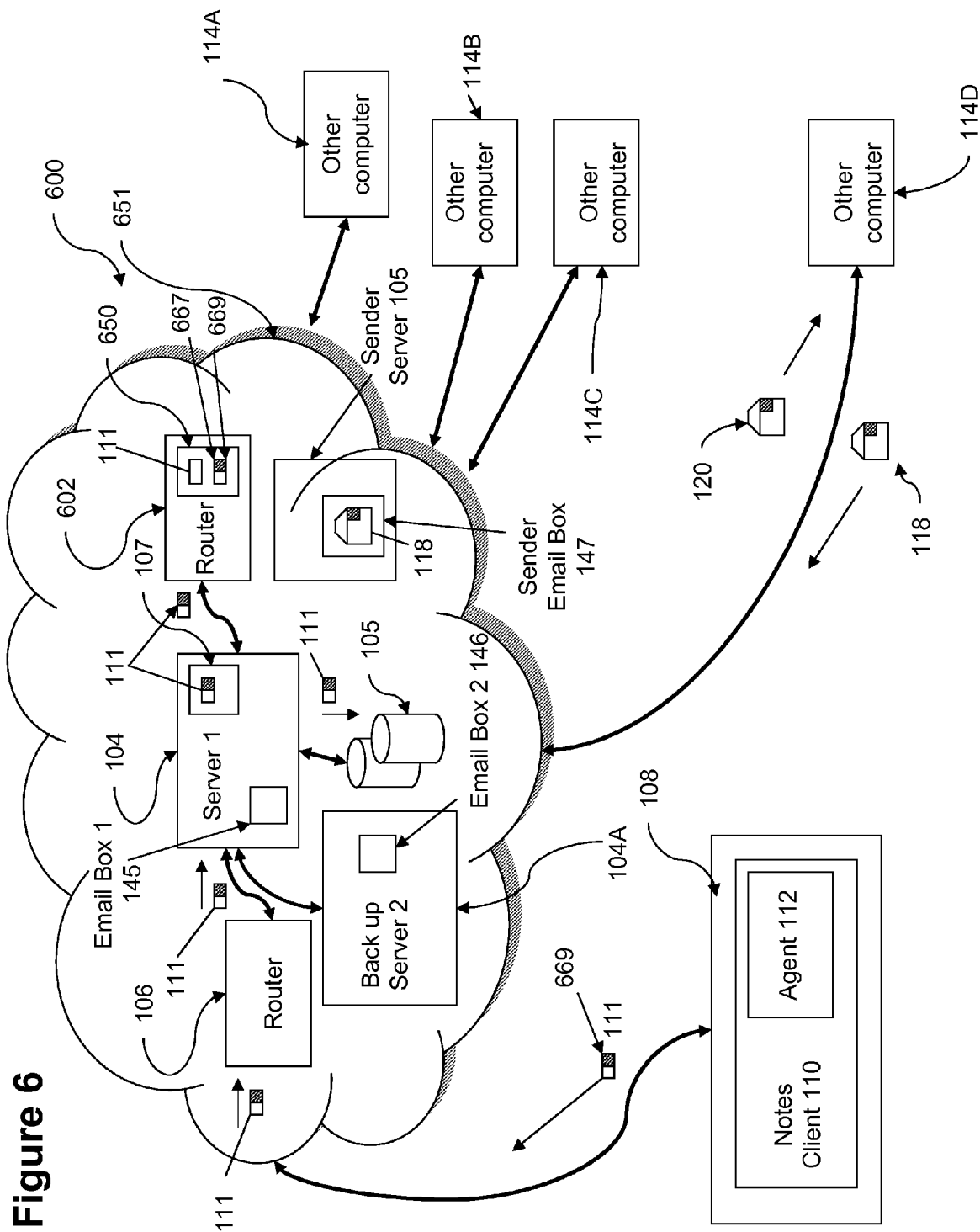
FIG. 6 shows an illustrative execution environment for an application according to an embodiment of the invention.

FIG. 6 illustrates Network Cloud 600 having a Receiving Router 602. Receiving Router 602 has an "Out of Office" Agent Responder 650 having Router Autoresponder 650 for receiving "Out of Office" Configuration File 111. Receiving Router 602 is connected to Storage 105 and to Router Autoresponder 650 which store the "Out of Office" Configuration File 111 received from the Server 104.

Server 104 has a Back Up Server 104A. When Server 104 goes down, Back Up Server 104A is called upon to send the "Out of Office" response. However, it may be that the Back up Server 104A may not be updated with the latest software so that it doesn't have the "Out of Office" Agent software. When Other Computer 114D sends an Email Message 118 to Network 600 it is received by Router 602. Router 602 has "Out of Office" Responder 650. "Out of Office" Responder 650 receives the "Out of Office" Response 111.

The Router Automatic Responder 650 receives the Email Message 118 to the Intended Recipient 110 which then passes it along to the Back Up Server 104A. The The Router Automatic Responder 650 has an Agent Trigger 667 which launches automatically when the Main Email Server 104 fails. Agent Trigger 667 has a Special Flag 669 sent by Client 110 which indicates to Router 602 to launch when Main Server 104 fails.

Also, it could be that router 602 does have this capability and main email server 104 and back up server 104A are not using the same version of server software as noted above. Sometimes, it is the case that main email server 104 has a newer version of server software than backup email server 104A. This is frequent as server software for numerous servers is not updated simultaneously. In another embodiment of the present invention, main email server software has different functionality than back up email server 104A and has a router component which has the function discussed above. It may be desirable for the main email server 104 to update the backup email server 104A with the up level version of the server software. There are many ways of performing this. For instance, in Lotus Domino, two Domino servers replicate in order share the same data. Using the replicate function (or equivalents), the main email server 104 can replicate the router component or other server software components to backup server 104A so that the two servers are compatible.

FIG. 7 illustrates one embodiment of the user interface for configuring an agent trigger of the present invention at 800. At 802, the party or role configuring the screen is input. A trigger event field 808 is shown having two options such as trigger on event or trigger on schedule. When Agent Starts Field 810 allows the configuring party to choose when the Agent starts such as when server starts.

For simplicity purposes, the system of the present invention has been principally discussed in terms of a sender client sending an email to a recipient client. The present invention should in now way be so limited. In reality, many times, each sender client has a sender mail server and each recipient client has a recipient email server. Email from a sender to a recipient is passed from the sender mail server to the recipient mail server. The recipient may use the recipient client to view/manipulate the email directly on the recipient mail server or, alternatively, the recipient may choose to have a copy (replica) downloaded to the recipient client for local viewing and manipulating. Likewise, a sender may use the sender client to create an email directly on the sender mail server or, alternatively, the sender may create the email locally at the sender mail client and then replicated to the sender mail server which forwards the email to recipient mail server. The recipient mail server, corresponding router functionality and out of office responder functionality is responsible for providing out of office notifications to sender mail server, such notifications are picked up by sender utilizing the sender email client. FIG. 6 shows this in an alternate configuration where a sender utilizing Sender Client 114D to create email 118, sends email 118 to recipient but recipient's client 110 has notified Server 1 104 that recipient has an out of office status. Email 118 is either created locally at Sender Client 114D and replicated to Sender Email Box 147 in Sender Server 105 and then passed on to Recipient Mail Server 104 and Router 602. Alternatively, sender utilizes Sender Client 114D to create and send the email directly from Sender Mail Box 147. As such, it should be clear that the present invention should be construed to include a centralized mail service (such as, e. g., provided by an ISP) where the sender and recipient clients merely provide access to the server services.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. An email system for conveying email messages from senders to recipients, the senders and the recipients each having an email client for allowing the senders and recipients to create and view email and for sending out of office notifications to senders when a recipient is out of the office, the system comprising:
    a mail server for each sender;
    a mail server for each recipient for receiving email from the sender mail server when a sender has created an email and sent the email from his sender mail server to the recipient mail server, the recipient email server having an out of office agent for sending out of office notifications to email senders when the intended email recipients is not available;
    a backup email server for providing redundancy for the main email server if the main email server fails;
    a receiving router for receiving the email message;
    a sending router for sending the email message; and
    an out of office agent responder in the receiving router for, in a case that the recipient mail server has failed and is unable to send a notice that the intended receiver is not available, responding by the receiving router to the sender client with a notice originating from the receiving router that the intended receiver is not available.

2. The system of claim 1 wherein the receiving router further comprises an agent trigger for triggering the out of office agent responder when the main email server fails.

3. The system of claim 2 wherein the router has bootstrapping logic which has an agent task manager which runs the out of office agent responder.

4. The system of claim 3 wherein the bootstrapping logic has a special flag which indicates to the agent task manager to run the out of office agent responder.

5. A method for processing a response to an email message from one or more email senders who have sent an email message to one or more intended email recipients through a system having main email server and a receiving router, the method of processing the email message when the main email server has failed, the method comprising the steps of:
    from the one or more intended recipients, sending an out of office agent configuration file to the main mail server;
    receiving, at the main mail server, the out of office agent configuration file;
    passing the out of office agent configuration file to the router and storing the out of office agent configuration file at the router in an out of office agent responder;
    receiving, at the router, one or more email messages; and
    sending, in a case that the recipient mail server has failed and is unable to send an out of office notification, an out of office notification that originates from the router out of office responder of the router to the sender.

6. The method of claim 5 further comprising, at the router, the step of parsing, from the out of office agent configuration file, the special flag indicating to the out of office agent responder to respond to the sender that the intended recipient is unavailable.

7. A computer program comprising program code stored on a non-transitory computer storage medium, which when executed, enables a computer system for processing a response to an email message from one or more email senders who have sent an email message to one or more intended email recipients through a system having main email server and a receiving router, the code having software for processing the email message when the main email server has failed, the software comprising the steps of:
    from the one or more intended recipients, sending an out of office agent configuration file to the main mail server;
    receiving, at the main mail server, the out of office agent configuration file;
    passing the out of office agent configuration file to router and storing the out of office agent configuration file at the router in an out of office agent responder;
    receiving, at the router, one or more email messages addressed to the intended recipients; and
    sending, in a case that the recipient mail server has failed and is unable to send an out of office notification an out of office notifier that originates from the router out of office responder of the router to the sender.

8. The computer program of claim 7 further comprising the step, at the router, the step of parsing, from the out of office agent configuration file, the special flag indicating to the out of office agent responder to respond to the sender that the intended recipient is unavailable.

9. A system for failover processing for automatic response in a mixed server environment having
    a main email server for processing emails from at least two email clients, the main email server having server software, the main email server software has a router component for processing out of office requests from the at least two email clients,
    a back up email server connected to the main email server for providing back up to and replicating with the main email server when the main email server fails, the back up email server having back up email server software which is different from the main email server software,
    wherein when router component receives an out of office configuration file from a first email client and it receives an email from a second email client directed to the first email client, the router component sends the second email client an out of office notification originating from a router and marks the email with a special flag indicating that it had responded to the email.

10. The system of claim 9 wherein the main email server fails and, when the main email server comes back up, the main email server examines the received email from the second email client and determines that the special flag is set and no further action is needed.

11. The system of claim 9 further wherein the out of office notification is responded to in-line with mail delivery.

12. The system of claim 9 wherein the main email server software updates the backup email server software during a replication process so that the backup email server software has the same function as the main email server software.

13. The system of claim 12 further wherein, after the replication process, the back up has a router component and further wherein, when main email server goes down, it sends the second email client an out of office notification and marks the email with a special flag indicating that it had responded to the email.

14. The system of claim 13 wherein the out of office notification is responded to in-line with mail delivery by the back up server.

15. A method for failover processing for automatic response in a mixed server environment having a main email server for processing emails from at least two email clients, the main email server having server software, the main email server software has a router component for processing an out of office configuration file from at least one email clients and for sending out of office notifications to any email clients sending email to the at least one client when the at least one client has an out of office status, a back up email server connected to the main email server for providing back up to and replicating with the main email server when the main email main email server fails, the back up email server having back up email server software which is different from the main email server software, the method comprising the steps of:

a. receiving, at the router component, an out of office configuration file from a first email client;

b. receiving, at the router component, an email from a second email client directed to the first email client;

c. sending, from the router component in a router to the second email client, an out of office notification, the out of office notification originating at the router; and d. marking, by the router component, the email with a special flag indicating that it had responded to the email.

16. The method of claim 15 further comprising the steps of, when the main email server fails and when it comes back up, examining the received email from the second email client and determining that the special flag is set and no further action is needed.

17. The method of claim 15 further comprising the step of responding with an out of office notification in-line with mail delivery.

18. The method of claim 15 further comprising the step of the main email server software updating the backup email server software during a replication process.

19. The method of claim 18 further wherein, after the replication process, the back up has a router component and further wherein, when main email server goes down, the method further comprises the steps of sending, from the backup server to the second email client an out of office notification and marking the email with a special flag indicating that it had responded to the email.

20. The method of claim 19 further comprising the step of, when the main email server comes back up, the main email server examining the received emails at the back up server to determine whether any special flags were set.

\* \* \* \* \*